United States Patent [19]

Hopper

[11] Patent Number: 5,074,636
[45] Date of Patent: Dec. 24, 1991

[54] FIBER OPTIC CABLE ENTRY CONNECTOR

[75] Inventor: Scott R. Hopper, Redmond, Wash.

[73] Assignee: Augat Communications Group, Inc., Seattle, Wash.

[21] Appl. No.: 541,618

[22] Filed: Jun. 21, 1990

[51] Int. Cl.⁵ .............................................. G02B 6/36
[52] U.S. Cl. ....................................... 385/76; 385/53
[58] Field of Search ............... 350/96.20, 96.21, 96.22, 350/96.23

[56] References Cited

U.S. PATENT DOCUMENTS

| | | | |
|---|---|---|---|
| 4,444,461 | 4/1984 | Wey et al. ....................... | 350/96.21 |
| 4,579,418 | 4/1986 | Parchet et al. ................... | 350/96.20 |
| 4,953,941 | 9/1990 | Takahashi ....................... | 350/96.20 |
| 4,964,685 | 10/1990 | Savisky et al. .................. | 350/96.20 |

Primary Examiner—William L. Sikes
Assistant Examiner—Phan T. Heartney
Attorney, Agent, or Firm—Weingarten, Schurgin Gagnebin & Hayes

[57] ABSTRACT

A fiber optic cable entry connector is described that facilitates integration of fiber optic cables with trunk housings of the type utilized in the CATV industry. The entry connector provides EMI/RFI shielding and weather sealing and is readily compatible with existing fiber optic cables. The entry connector may be reused and may be cycled open and closed to facilitate access to the cable. The entry connector includes a clamp assembly and an entry body that are configured to be mated in combination. The clamp assembly is configured to secure the cable within the connector and to provide weather sealing between the connector and the cable. The clamp assembly is configured to preposition the cores of the cable for insertion through the entry body and into the trunk enclosure. The clamp assembly may be readily adapted to accommodate any sized existing fiber optic cables. The entry body is configured to interface with the trunk housing via a threaded port thereof such as standard ⅝-24, ⅜-24, ½-24 or 1-24 entry or test ports associated with the housing. Sealing members may be disposed in combination with the entry body to provide weather sealing for the connector and between the entry body and the trunk enclosure. The clamp assembly and the entry body are keyed to preclude rotation of the cable.

18 Claims, 6 Drawing Sheets

FIBER OPTIC CABLE ENTRY CONNECTOR

FIELD OF THE INVENTION

The present invention relates to connectors, and more particularly to a fiber optic cable entry connector for integrating fiber optic cables into fiber optic trunk enclosures.

BACKGROUND OF THE INVENTION

Fiber optic technology is now being utilized with increased frequency in the CATV industry One aspect of this increased utilization requires that fiber optic cable be integrated into EMI/RFI shielded and weather sealed aerial, buried and underground enclosures/trunk housings. The trunk housings contain fiber optic connectors of types know in the art, such as described in U.S. Pat. No. 4,444,461, which are utilized to precisely space and align the clad cores of the fiber optic cables.

Current methods for integrating fiber optic cables into shielded/sealed trunk housings are varied and often result in compromise of the integrity of the EMI/RFI shielding and/or weather sealing. For example, one method of integration involves drilling a hole into one side of the trunk enclosure. The hole is lined with a rubber grommet and the fiber optic cable fed through the grommeted hole until positioned so that the central strength member can be secured to a fastener within the housing. After the cable is securely positioned and aligned, silicon grease is applied to the grommet/cable entry area to enhance the weather seal.

The method for integrating fiber optic cables into a trunk housing as described in the preceding paragraph does not provide EMI/RFI shielding. Furthermore, the cable is only secured by friction forces exerted by the grommet such that the cable may be inadvertently subject to rotation which may adversely affect core spacing/alignment. In addition, such movement of the cable may degrade the weather seal such that sufficient protection against environmental conditions is not provided, thereby allowing contaminating matter to enter the trunk housing.

A need exists for a fiber optic cable entry connector which facilitates integration of fiber optic cables with trunk housings. The connector should provide both EMI/RFI shielding and proper weather sealing to preclude conditions which may adversely affect data transmission between cable cores. The connector should be readily compatible with the various constructions and sizes of fiber optic cables available in the market today. The connector should be configured to preclude inadvertent rotation of the cable. The connector should facilitate preparation of the cable prior to integration with the trunk housing.

SUMMARY OF THE INVENTION

A fiber optic cable entry (OCE) connector is provided that facilitates integration of fiber optic cables with trunk enclosures. The OCE connector provides EMI/RFI shielding and proper weather sealing to preclude conditions which may adversely affect data transmission between cable cores and/or degrade the operation of associated electronic components within the trunk enclosure. The OCE connector is readily compatible with the various constructions and sizes of fiber optic cables available in the market today. The OCE connector is configured to preclude inadvertent rotation of the cable. The OCE connector facilitates preparation of the cable prior to integration with the trunk housing. The OCE connector is configured so that both the outer jacket and the central strength member of the fiber optic cable are secured thereto. The configuration of the OCE connector allows the connector to be reused, and in addition, allows the connector to be cycled open or closed. The OCE connector is configured for integration with a threaded port of the trunk enclosure such as standard $\frac{5}{8}$-24, $\frac{3}{4}$-24, $\frac{7}{8}$-24 or 1-24 entry or test Ports associated with trunk enclosures.

The OCE connector according to the present invention includes a clamp assembly for mounting and generally aligning a fiber optic cable within the connector and an entry body for interfacing the connector with a threaded port of the trunk housing such as standard $\frac{5}{8}$-24, $\frac{3}{4}$-24, $\frac{7}{8}$-24 or 1-24 entry or test ports associated with trunk housings. The clamp assembly includes a clamp nut, an internal collet, an internal sealing subassembly, and a clamp body. The clamp assembly and the entry body provide EMI/RFI shielding for the connector and preclude the entry of interference radiation into the trunk housing The internal sealing subassembly and sealing members disposed in combination with the entry body provide weather sealing for the connector, between the connector and the cable, and between the connector and the trunk housing.

The clamp nut is configured to mate with the entry body and to be disposed about the cable. The internal configuration of the clamp nut provides for internal mounting of the collet, the sealing subassembly and the clamp body. The external configuration of the clamp body facilitates mating engagement with the entry body.

The collet is configured for internal mounting within the clamp nut. The internal configuration of the collet provides press fit engagement with the jacket of the fiber optic cable, thereby facilitating securement of the fiber optic cable within the OCE connector. The internal configuration of the collet may be readily reconfigured to accommodate fiber optic cables of varied outside diameters.

The sealing subassembly is configured for internal mounting within the clamp nut. The sealing subassembly interacts with the clamp nut, the collet and the fiber optic cable to provide weather sealing between the clamp assembly and the fiber optic cable.

The clamp body is configured to be mounted within the clamp nut and to permit the clamp nut to be rotated relative to the clamp body. The clamp body includes a cylindrical portion internally configured to act as a stop for the fiber optic cable and which may be readily reconfigured to accommodate fiber optic cables of varied outside diameters. The clamp body includes a means for securing the central strength member of the fiber optic cable to the clamp body, thereby facilitating securement of the cable within the OCE connector. The clamp body also includes an interfacing portion configuration that is "keyed" to corresponding structure of the mating body such that mating between the clamp body and the entry body is controlled and relative rotation between the fiber optic cable and the OCE connector is precluded. The interfacing portion is also configured to preposition the optic cores of the cable for insertion into the entry member.

The entry body is configured to be mated in combination with the clamp assembly and to interface with a threaded port of the trunk enclosure. The entry body includes a first threaded portion that is configured for threaded engagement with the threaded port which may be a standard ⅝-24, ¾-24, ⅞-24 or 1-24 entry or test ports associated with trunk enclosures. The entry body further includes a second threaded portion configured for threaded engagement with the clamp nut. The internal configuration of the second threaded member is "keyed" to the interfacing portion of the clamp body to preclude relative rotation between the clamp body and the entry body. Sealing members disposed in combination with the entry body interact with the trunk housing and the clamp nut, respectively, to provide weather sealing between the entry body and trunk enclosure and between the clamp assembly and the entry body.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION OF PREFERRED EMBODIMENTS

Figure 1:
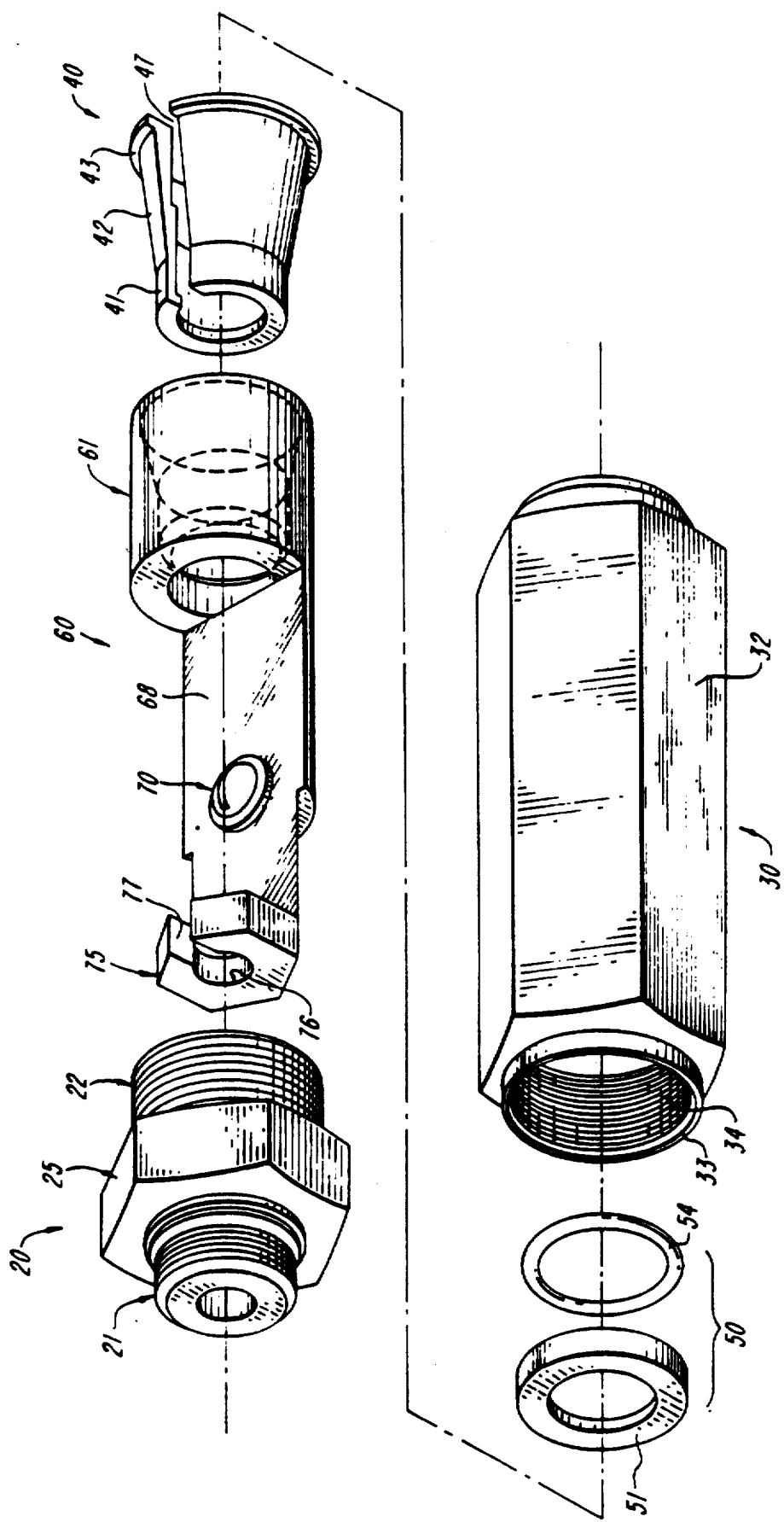
FIG. 1 is an exploded perspective view of an embodiment of a fiber optic cable entry connector according to the present invention.
Figure 2:
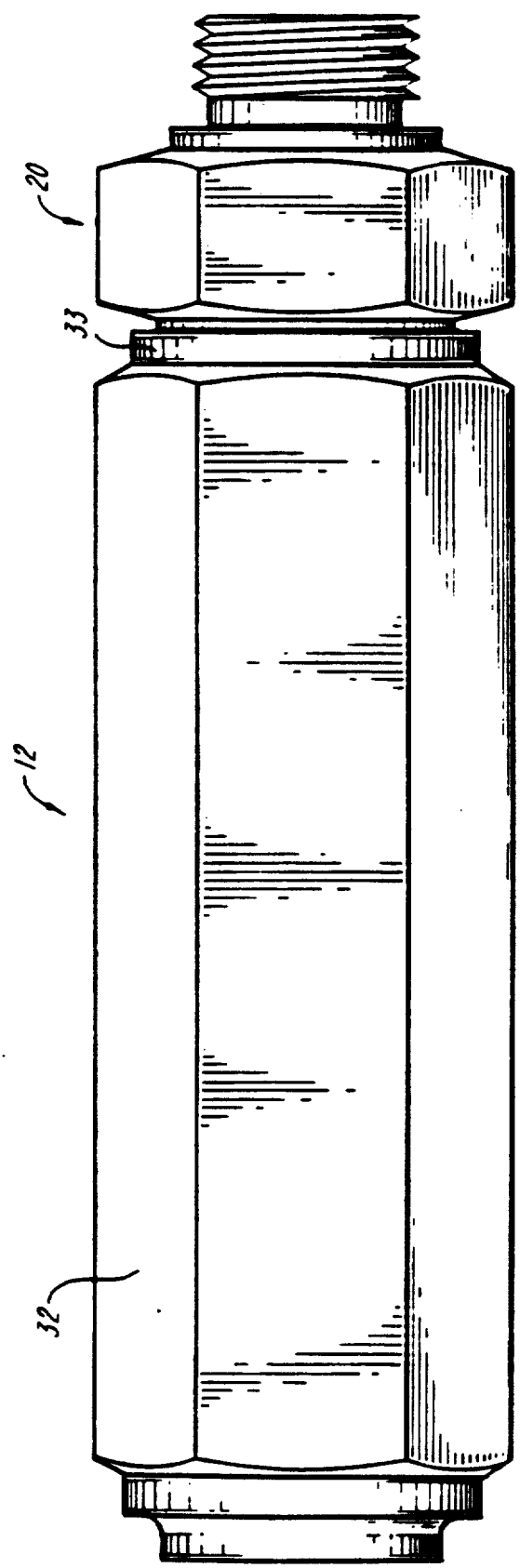
FIG. 2 is a plan view of the assembled connector of FIG. 1.
Figure 3:
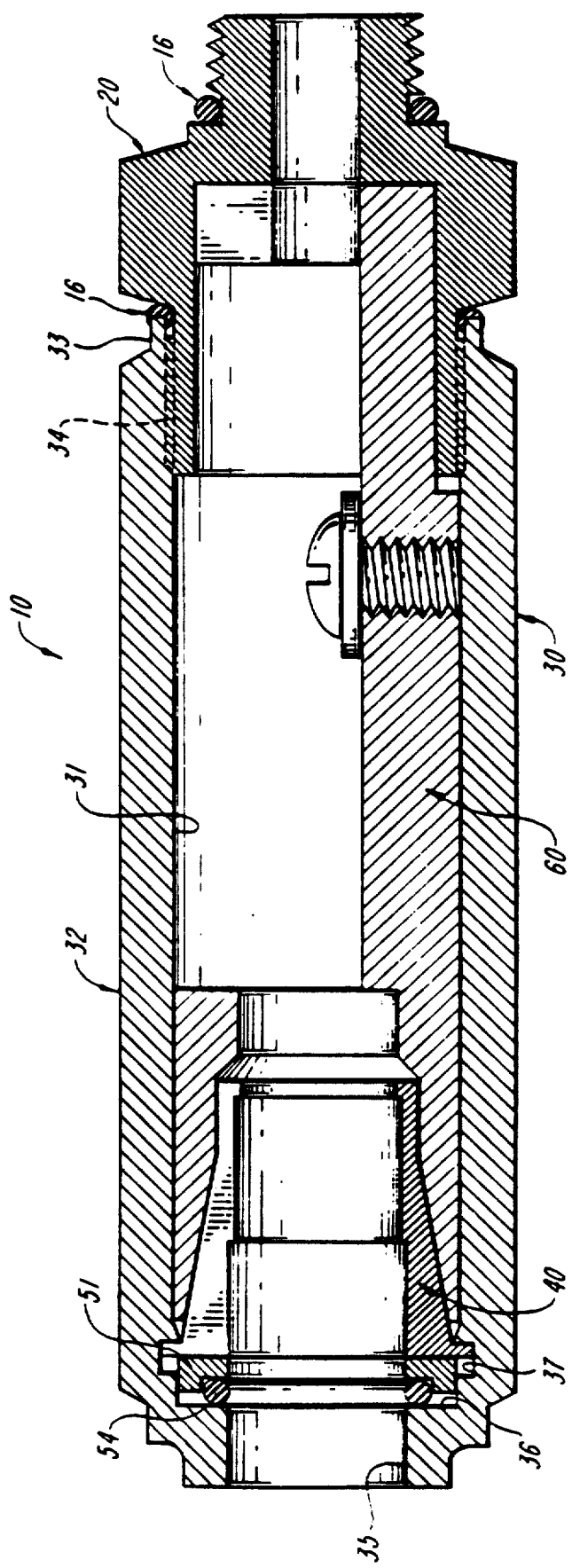
FIG. 3 is a cross-sectional view of the connector of FIG. 2.
Figure 8:
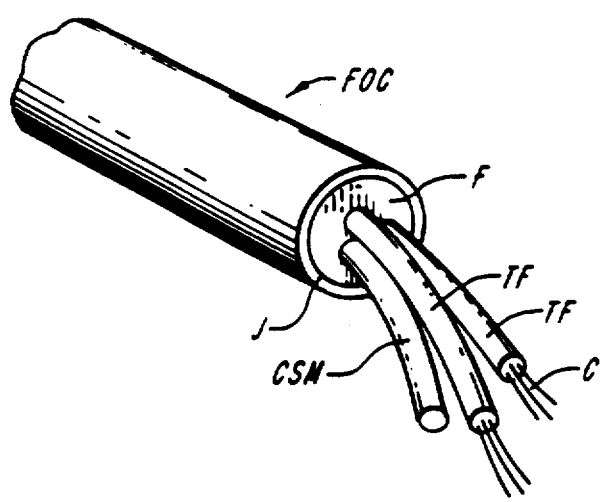
FIG. 8 is a sectioned perspective view of a typical fiber optic coaxial cable.

Referring now to the drawings wherein like reference numerals designate corresponding or similar elements throughout the several views, one embodiment of a fiber optic cable entry (OCE) connector 10 is exemplarily illustrated in FIGS. 1, 2 and 3. The configuration of the OCE connector 10 facilitates quick preparation of a fiber optic cable for integration with a fiber optic trunk housing (not shown) and provides EMI/RFI shielding and weather sealing. To facilitate a better understanding of the following disclosure, reference is made to FIG. 8 which shows one typical embodiment of a fiber optic cable FOC known to those skilled in the art. The fiber optic cable shown includes a jacket (J), first and second tubed fibers TF having clad cores C therein for transmitting light radiation, a central strength member CSM, an extra strength member ESM and filler F.

The OCE connector 10 according to the present invention includes a clamp assembly 12 configured for securing and generally aligning a fiber optic cable in combination with the connector and an entry body 20 configured for interfacing with a threaded port (not shown) of the trunk housing. The clamp assembly 12 includes a clamp nut 30, an internal collet 40, an internal sealing subassembly 50, and a clamp body 60. The structural elements of the OCE connector 10, with the exception of the sealing elements, may be formed from a mechanically rigid material such as aluminum or high strength plastic.

The clamp nut 30, illustrated in greater detail in FIGS. 1 and 3 has an extended configuration and an internal circular bore 31 dimensioned to receive the entry body 20, the collet 40, the internal sealing subassembly 50 and the clamp body 60, respectively, as described in greater detail hereinbelow. The external surface 32 of the clamp nut 30 has a hexagonal configuration to facilitate mating of the clamp nut 30 with the entry body 20. A first end of the clamp nut 30 includes an integral annular flange 33 and internal threads 34. The other end of the clamp nut 30 includes an entry bore 35, an internal annular stepped shoulder 36, and an internal annular well 37. The entry bore 35 is dimensioned to receive the fiber optic cable. The internal well 37 is configured to receive and retain the collet 40 internally within the clamp nut 30. The stepped shoulder 36 is configured for mounting the internal sealing subassembly 50 within the clamp nut 30.

Figure 4:
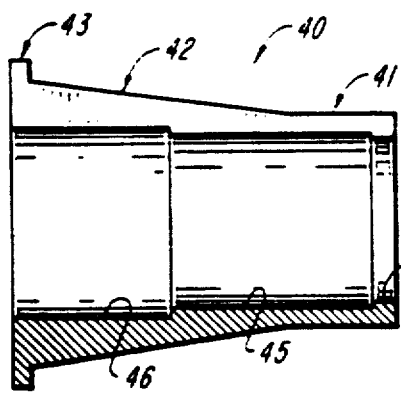
FIG. 4 is a cross-sectional view of a collet for the connector of FIG. 1.

The collet 40 is shown in FIG. 4 and has a first end 41 having a cylindrical configuration, an intermediate tapering portion 42 and an annular flange 43 at the second end thereof. The annular flange 43 is dimensioned to abuttingly engage the forward wall of the internal annular well 37 of the clamp nut 30 such that the collet 40 is retained therein. The first end of the collet 40 has a reduced aperture 44 that is dimensioned to press fit engage the jacket of the fiber optic cable. The internal configuration of the collet 40 includes a first circular bore 45 and a second circular bore 46. The body of the collet 40 is split lengthwise, as illustrated by reference numeral 47 in FIG. 1, to facilitate mounting of the collet 40 within the clamp nut 30.

The first circular bore 45 may be dimensioned to accommodate fiber optic cables of varied outer diameters. Fiber optic cables available in the market today may have outer diameters of 0.312, 0.360, 0.400, 0.420, 0.430, 0.440, 0.460, 0.470, 0.480, 0.490, 0.510, 0.520, 0.560 or 0.600 inches. The collet 40 allows the OCE connector 10 according to the present invention to be readily modified to accommodate fiber optic cables of differing outer diameters.

Figure 5:
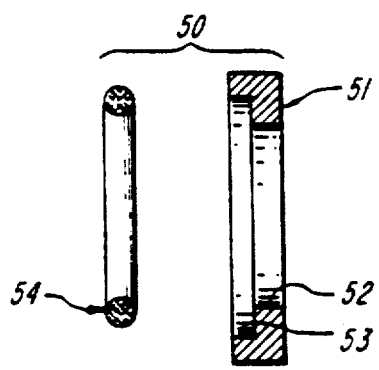
FIG. 5 is a cross-sectional view of an internal sealing means subassembly for the connector of FIG. 1.

The internal sealing assembly 50 is illustrated in FIG. 5 and includes an annular carrier 51 and an O-ring 54. The carrier 51 has a first bore 52 and a second bore 53 dimensioned for mounting the O-ring 54. As shown in FIG. 3, the internal sealing assembly 50 is dimensioned to loosely nest within the internal stepped shoulder 36 of the clamp nut 30. One face of the annular carrier 51 abuts against the face of the annular flange 43 of the collet 40 and the O-ring 54 abuts against the internal shoulder 36 such that the other face of the annular carrier 51 is spaced apart from the internal shoulder 36.

Figure 6A:
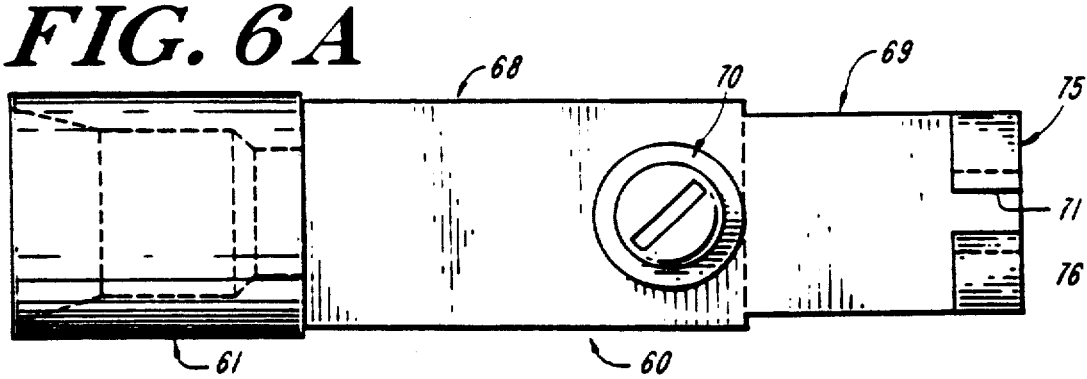
FIG. 6A is a plan view of a clamp body for the connector of FIG. 1.
Figure 6B:
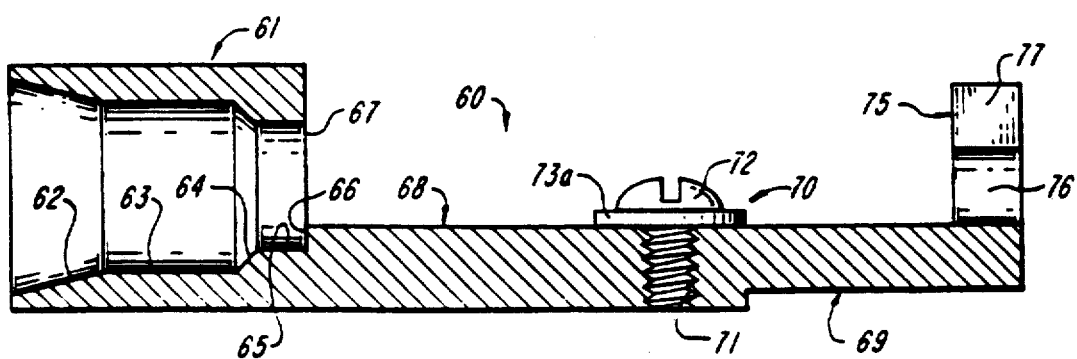
FIG. 6B is a cross-sectional view of the clamp body of FIG. 6A.

The clamp body 60 is depicted in FIGS. 6A and 6B and for the embodiment illustrated has an overall length of about 3.5 inches. The clamp body 60 has a configuration so that it may be nested internally within the clamp nut 30 in combination with the collet 40 and such that a portion thereof extends outwardly of the integral annular flange 33. The clamp body 60 includes a first end 61 of cylindrical configuration. The cylindrical portion 61 has an internal configuration that includes a first tapered bore 62, a first circular bore 63, a second tapered bore 64 and a second circular bore 65. The second tapered bore 65 may act as a stop for the fiber optic cable. The second circular bore 65 is dimensioned to accommodate fiber optic cables of varied outer diameters as discussed hereinabove with respect to the first circular bore 45 of the collet 40.

The clamp body 60 further includes an intermediate, solid semicylindrical member 68 and an interfacing portion 69. The arcuate portion of the semicylindrical member 68 is configured so that the clamp body 60 is slidably receivable within the internal bore of the clamp nut 30 and allows the clamp nut 30 to be rotated relative to the clamp body 60. The first tapered bore 62 and the first circular bore 63 of the cylindrical Portion 61 are dimensioned to engage the outer surfaces of the tapered portion 42 and the cylindrical portion 41, respectively, of the collet 40.

An end face portion 66 of the partial semicylindrical member 68 partially blocks the second circular bore 65 such that the opening 67 of the cylindrical portion 61 onto the semicylindrical member 68 is less than fully circular. The end face portion 66 may function as a stop for the fiber optic cable.

A means 70 for securing the central strength member CSM of the fiber optic cable to the clamp body 60 is disposed in combination with the semicylindrical member 68. For the embodiment illustrated in FIGS. 6A and 6B, the means 70 comprises a threaded bore 71 extending through the semicylindrical member 68, a complementary screw 72, and a bellevue washer 73a. The central strength member CSM of the fiber optic cable is disposed on the planar surface of the semicylindrical member 68 and secured thereto by threading the washer 73a to physically engage the strength member CSM.

Figure 6C:
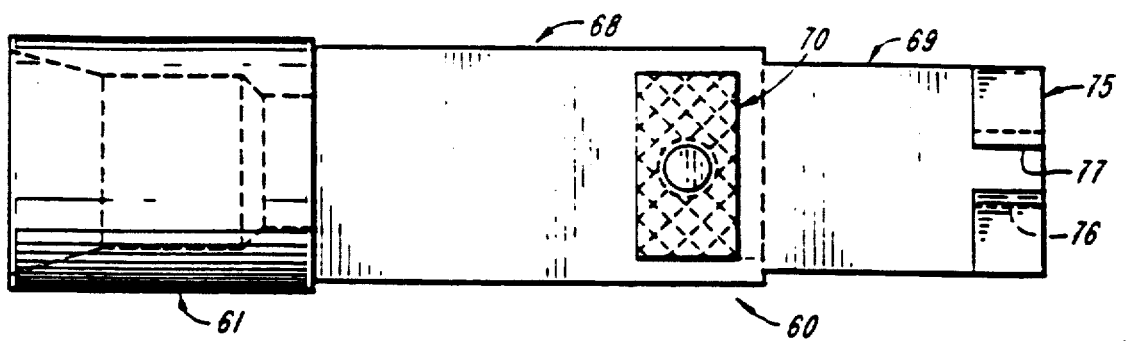
FIG. 6C is a plan view of the clamp body illustrating an alternate embodiment of the cable securing means.
Figure 6D:
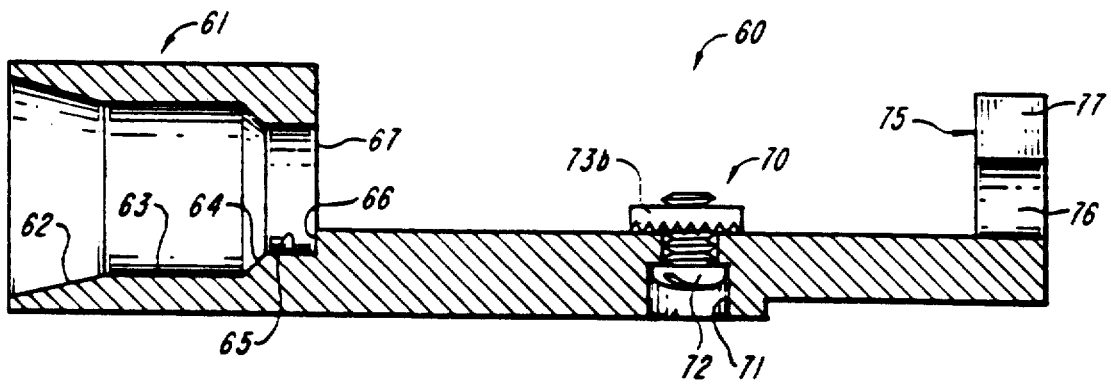
FIG. 6D is a cross-sectional view of the clamp body of FIG. 6C.

An alternative embodiment of the cable securing means 70 is illustrated in FIGS. 6C and 6D and includes a stepped bore 71, the smaller portion of which is threaded, extending through the semicylindrical member 68, a complementary screw 72 which is countersunk in the semicylindrical member 68, and an engaging clamp 73b. The central strength member CSM of the fiber optic cable is disposed on the planar surface of the semicylindrical member 68 and secured thereto by threading the clamp 73b to physically engage the strength member CSM.

As illustrated in FIGS. 6C and 6D, the engagement clamp 73b has a rough surface to facilitate engagement of the central strength member CSM. The engaging face of the clamp 73b may be smooth, and the clamp 73b may have shapes other than the illustrated rectangular shape. While the cable securing means 70 has been described in the preceding paragraphs as engaging only the central strength member CSM of the fiber optic cable, it will be appreciated that the extra strength member ESM of the fiber optic cable could also be secured in a similar manner.

The interfacing portion 69 is configured to be mated with the entry body 20 and includes an extended portion 74 integral with the semicylindrical member 68 and an interlocking portion 75 configured for interlocking engagement with complementary structure of the entry body 20. With the interfacing portion 69 mated in combination with the entry body 20, the interlocking Portion 75 locks the clamp body 60 in combination with the entry body 20 and precludes rotation of the clamp body 60 during mating of the clamp nut 30 with the entry body 20.

As illustrated in FIGS. 6A, 6B, 6C and 6D, the extended portion 74 has a solid triangular configuration and the interlocking portion 75 has a slotted hexagonal configuration. Two faces of the slotted hexagonal portion 75 are integral with corresponding faces of the triangular portion 74. The slotted hexagonal portion 75 includes a circular bore 76 and a slot 77 opening into the circular bore 76 for prepositioning the clad cores C of the cable for insertion into the entry body 20.

The interlocking portion 75 may have other configurations which facilitate locking between the clamp body 60 and the entry body 20. For example, the interlocking portion 75 may have other non-cylindrical configurations or may include one or more pins configured for insertion in complementary apertures of the entry body 20, thereby locking the clamping body 60 in combination with the entry body 20.

Figure 7A:
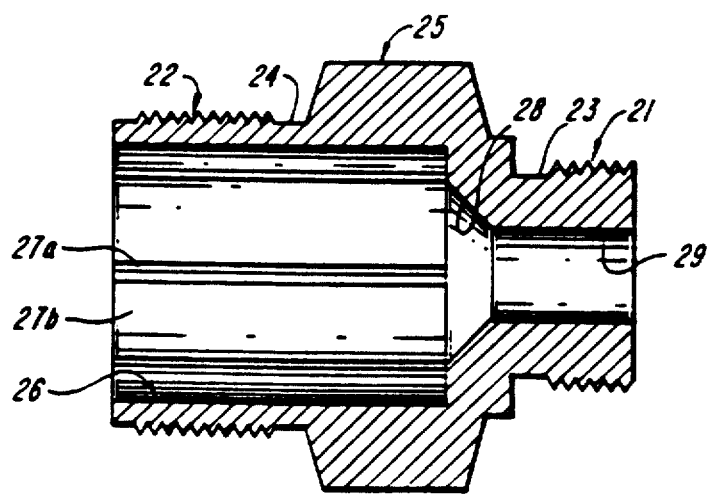
FIG. 7A is a cross-sectional view of an entry body for the connector of FIG. 1.
Figure 7B:
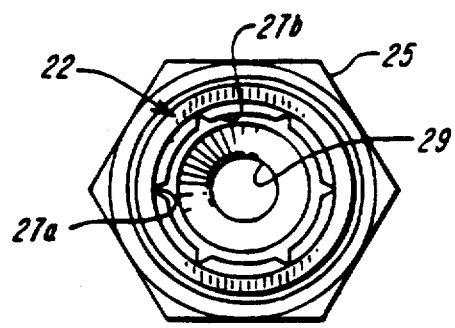
FIG. 7B is an end plan view of the entry body of FIG. 7B.

The entry body 20 is illustrated in FIGS. 7A and 7B and is configured to be disposed in combination with the clamp assembly 12 and to interface with a threaded entry port (not shown) of the trunk housing. Preferably the entry body 20 is configured to interface with standard $\frac{5}{8}$-24, $\frac{3}{4}$-24, $\frac{7}{8}$-24 or 1-24 entry or test ports associated with trunk housings. The entry body 20 is further configured to provide, in combination with the clamp body 60, a "keyed" structure that precludes inadvertent rotation of the fiber optic cable that is secured within the OCE connector 10.

The entry body 20 includes a first threaded member 21 configured for threaded engagement with a threaded entry port of the trunk housing and a second threaded member 22 configured for threaded engagement with the internal threaded 34 of the clamp nut 30. Wells 23, 24 are formed adjacent the first and second threaded members 21, 22, respectively, for O-rings 16. The entry body 20 also includes an intermediate hexagonal portion 25 to facilitate threaded engagement of the entry body 20 with the threaded entry port.

The entry body 20 includes an internal bore configuration 26 that is "keyed" to the external configuration of the interlocking portion 75 of the clamp body 60, a tapered annular bore 28, and a cylindrical bore 29. The cylindrical bore 29 is dimensioned to accommodate the core(s) of the fiber optic cable that is secured in combination with the clamp subassembly 12.

As shown in greater detail in FIG. 7B, the internal bore configuration 26 includes a plurality of V-shaped extended notches 27a equidistantly spaced about the circumference of the bore, and slightly arcuate extended surfaces 27b intermediate adjacent notches 27a. The "keyed" relationship between the slotted hexagonal portion 75 and the internal bore configuration 26 permits the clamp body 60 to be inserted into the entry body 20 only in 60° increments. Once inserted, interaction between the "keyed" elements, i.e., the slotted hexagonal portion 75 of the clamp body 60 and the internal bore configuration 26 of the entry body 20, precludes relative rotation between the clamp body 60 and the entry body 20.

To utilize the OCE connector, the clamp nut 30, with the internal sealing means 50 and the collet 40 seated internally therein, is slid onto the jacket of the fiber optic cable. A length of the jacket is removed to expose the loose or tubed fibers. The clamp body 60 is slid onto the cable until the cable jacket abuts against the second tapered bore 64 or the stop 66. The central strength member CSM is then secured to the clamp body 60 by means of the cable securing means 70. The excess strength member ESM of the cable is removed and the fiber(s) insert through the slot 77 into the circular bore 76.

The entry body 20 is then mated in combination with the entry port of the trunk housing by threading the first threaded end 21 into the entry port. The O-ring 16 in the well 23 is compressed intermediate the well wall and the port of the trunk housing to provide a weather seal between the entry body 20 and the trunk housing. The fiber(s) are inserted into the entry body 20 and through the cylindrical bore 29 and the slotted hexagonal portion 75 of the clamp body 60 is mated with the internal bore configuration 26 of the entry body 20. The clamp nut 30 is then slid forward onto the clamp body 60 and the internal threads 34 are threaded into engagement with the second threaded member 22 of the entry body 20. The O-ring 16 in the well 24 is compressed intermediate the annular flange 33 and the hexagonal portion 25 to provide a weather seal between the entry body 20 and the clamp assembly 12.

The internal collet 40 mechanically engage the cable jacket to retain the fiber optic cable in combination with the OCE connector 10. The O-ring 54 of the internal sealing assembly 50 interacts with the cable jacket, the annular carrier 51 and the wall of the clamp nut 30 to provide a weather seal between the OCE connector 10 and the fiber optic cable. The entry body 20 and the clamp nut 30 provide EMI/RFI shielding.

A variety of modifications and variations of the present invention are possible in light of the above teachings. For example, the cable securing means may be modified to provide an enhanced gripping surface for engaging the central strength member and to provide a more uniform clamping force. The cable securing means may be relocated to the bottom portion of the clamp body to facilitate cable termination, to reduce the profile of the cable securing means and to allow a reduction in the overall length of the connector. Relocating the cable securing means may also reduce the congestion on the upper surface of the clamp body, thereby allowing a reduction in the overall length of the clamp body. It is therefore to be understood that within the scope of the appended claims, the present invention may be practiced otherwise than as specifically described hereinabove.

What is claimed is:

1. A fiber optic cable entry connector for integrating a fiber optic cable into a trunk housing that includes a threaded port, the fiber optic cable including an external jacket, at least one core and a strengthening member, comprising:

entry body means for integrating the connector with the trunk housing;

clamp assembly means for securing the fiber optic cable within the connector and for positioning the at least one core of the fiber optic cable for insertion into the trunk housing, said clamp assembly means comprising:

clamp nut means for providing EMI/RFI shielding for the connector, said clamp nut means and said entry body means in combination comprising said shielding means of the entry connector;

clamp body means rotatably mounted within said clamp nut means and including means for securing the strengthening member of the fiber optic cable within the connector, said clamp body means further including interface means configured for mating in interlocking combination with said entry body means;

said interface means and said entry body means being mated in interlocked combination to preclude rotation of the fiber optic cable relative to said entry body means; and means for providing weather sealing for said entry connector.

2. The fiber optic cable entry connector of claim 1 wherein said clamp assembly means includes sealing subassembly means mounted within said clamp nut means for providing weather sealing between the connector and the fiber optic cable, and wherein said weather sealing means includes said sealing subassembly means.

3. The fiber optic cable entry connector of claim 1 wherein said clamp assembly means includes collet means disposed within said clamp nut means for press fit engaging the jacket of the fiber optic cable to secure the fiber optic cable within the connector.

4. The fiber optic cable entry connector of claim 1 wherein said interface means has a keyed structure and wherein said entry body means has an internal bore configuration complementary to said keyed structure of said interface means such that said entry body means and said interface means are mateable together in interlocked combination to preclude rotation of the fiber optic cable relative to the connector.

5. The fiber optic cable entry connector of claim 1 wherein said clamp nut means includes an internally threaded end and wherein said entry body means includes first threaded means configured to interface with said internally threaded end of said clamp nut means for mating said entry body means in combination with said clamp assembly means to form the connector.

6. The fiber optic cable entry connector of claim 1 wherein said entry body means includes second threaded means configured to interface with the threaded port of the trunk housing for integrating the connector with the trunk housing.

7. The fiber optic cable entry connector of claim 1 wherein said weather sealing means includes first sealing means disposed in combination with said entry body means for providing weather sealing between said entry connector and the trunk housing.

8. The fiber optic cable entry connector of claim 1 wherein said weather sealing means includes second sealing means disposed in combination with said entry body means for providing weather sealing between said entry body means and said clamp assembly means.

9. A fiber optic cable entry connector for integrating a fiber optic cable having an external jacket and strengthening member to a trunk housing, comprising:

a housing having first and second matable members each defining when mated together an enclosed channel for allowing optic fibers to be passed from the external jacket to the trunk housing;

said first housing member having means for engagement to the trunk housing, an opening for allowing optic fibers to be channeled to the trunk housing, and means for releasably mating with said second housing member;

said second housing member having means for releasably mating with said first housing member and an opening for receiving the jacketed cable;

a clamp assembly enclosed at least partially within said defined channel and having ends, means disposed on one of said ends cooperative with said first housing member for locking the same against rotation with respect to said first housing member, means disposed on the same said end for aligning optic fibers with said first housing member opening, means disposed intermediate said ends for securing the cable strengthening member, and means disposed on the other of said ends and cooperative with said second housing member for clamping the jacketed cable within said channel and at a location near said second housing member opening.

10. The connector of claim 9 wherein said clamp assembly further includes a stop for preventing movement in one direction of the jacket of the fiber optic cable.

11. The connector of claim 9 wherein said means for securing the cable strengthening member includes a platform located between said fiber aligning means and said circumferentially clamping means.

12. The connector of claim 9 wherein said releasably mounting means of said first and second housing members includes means for threadably mating said housing members.

13. The connector of claim 9 further having means for weatherproofing between said first housing member and the trunk housing.

14. The connector of claim 9 further having means for weatherproofing between said housing members.

15. The connector of claim 9 further having means for weather proofing between said second housing member and the fiber optic cable.

16. The connector of claim 9 further comprising an internal annular stepped shoulder located at said second housing member opening.

17. The connector of claim 16 further comprising an annular washer located between said collet and said internal annular stepped shoulder for providing weatherproofing means between said second housing member and the jacketed cable.

18. The connector of claim 9, wherein said means for clamping includes a collet and means disposed on the other end of said ends of said clamp assembly cooperative with said collet for clamping the jacketed cable within said collet and at a location near said second housing member.

* * * * *